(12) United States Patent
Fathollahi et al.

(10) Patent No.: US 9,917,937 B1
(45) Date of Patent: Mar. 13, 2018

(54) PROTECTIVE CASE FOR MOBILE ELECTRONIC DEVICE WITH INTEGRATED CAMERA RING STAND

(71) Applicant: INCIPIO, LLC, Irvine, CA (US)

(72) Inventors: Andy Fathollahi, Corona del Mar, CA (US); Peter Tu, Long Beach, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

(21) Appl. No.: 15/391,218

(22) Filed: Dec. 27, 2016

(51) Int. Cl.
*H04M 1/00* (2006.01)
*H04B 1/08* (2006.01)
*H04M 1/04* (2006.01)
*H04B 1/3888* (2015.01)

(52) U.S. Cl.
CPC ............ *H04M 1/04* (2013.01); *H04B 1/3888* (2013.01)

(58) Field of Classification Search
CPC ............. H04M 1/0202; H04M 1/0249; H04M 1/0283; H04M 1/04; H04M 1/12; H04M 1/185; H04B 1/3877; H04B 1/3888; H04N 1/00559; H04N 5/2252
USPC ................... 455/347, 348, 557, 575.1, 575.8
See application file for complete search history.

(56) References Cited

U.S. PATENT DOCUMENTS

| | | | | |
|---|---|---|---|---|
| 8,681,491 | B1* | 3/2014 | Cruz | A45C 11/00 455/556.1 |
| 8,767,992 | B2* | 7/2014 | Lester, Jr. | H04R 1/2803 381/338 |
| 9,345,310 | B2* | 5/2016 | Chiu, Jr. | A45F 5/021 |
| 9,438,295 | B1* | 9/2016 | Song | H04B 1/3888 |
| 2013/0098788 | A1* | 4/2013 | McCarville | A45C 11/00 206/320 |

* cited by examiner

*Primary Examiner* — Quochien B Vuong
(74) *Attorney, Agent, or Firm* — Manatt, Phelps & Phillips, LLP (57) ABSTRACT

A protective case for an electronic device having an integrated camera ring stand is disclosed. The protective case includes a device compartment defined by multiple walls including a back side wall that is configured to overlie the back face of the device when the device is in the case. The back face wall includes a first aperture that is configured to encompass the camera feature on the back face of the mobile device when the device is in the case and a hinged stand that is coupled to the back face wall and movable from a fixed closed position to fixed open positions. The stand includes a second aperture that is configured to overlie the first aperture to facilitate camera operation in both the closed and open positions. The stand may be retained within a stand housing that is housed within a camera ring housing that may be a separate component from the stand housing.

20 Claims, 13 Drawing Sheets

PROTECTIVE CASE FOR MOBILE ELECTRONIC DEVICE WITH INTEGRATED CAMERA RING STAND

INCORPORATION BY REFERENCE TO RELATED APPLICATIONS

N/A.

BACKGROUND OF THE INVENTION

Field of the Invention

This invention relates to accessories for electronic devices and more specifically to user removable protective enclosures or cases for mobile electronic devices.

Description of the Related Art

Mobile consumer electronic products, such as smart and cellular phones, computing tablets, MP3/audio/video players, gaming devices and laptops are continuously and rapidly evolving to meet expanding consumer demands. Such devices are becoming more and more powerful, connected, and interactive, and with each new generation, new and improved screens and camera technology are incorporated in these devices. These days it is not uncommon for such mobile devices to be used as a primary means for viewing movies or other digital media as well as a primary means for taking pictures.

With the ever increasing domination of these two features, the inventors here have recognized that there is a continuing need for protective cases for such electronic devices that are capable of providing multiple viewing and operating positions while also protecting and facilitating the operation of the external camera lens and/or flash module.

BRIEF SUMMARY OF THE INVENTION

Disclosed are numerous aspects of a unique and inventive protective case configured to receive, retain and protect a mobile electronic device, such as a smart or mobile phone, a computing tablet, an MP3 player, a gaming device or other portable handheld electronic device that includes a camera and/or flash module on exterior surface thereof.

In one aspect, the protective case includes hinged stand that includes an integrated camera ring that is dimensioned to at least partially surround the camera lens of the device.

In another aspect, the stand is movable, back and forth, from fixed open and closed positions.

In another aspect, the integrated camera ring is configured to encompass both the camera lens and flash module of the device.

In another aspect, the protective case includes a stand housing that is configured to receive the stand when the stand is in the closed position.

In another aspect, the protective case includes a camera ring housing that is configured to be coupled to the stand. The camera ring housing may be molded into the protective case. The stand housing may be a separate component from the camera ring housing or may be incorporated therein, in which the camera ring housing would also be the stand housing.

In another aspect, magnets and/or detents are used to fix the stand in the open and/or closed positions.

In another aspect, the protective case is formed of molded polymer construction, metal and/or wood, or combinations or composites thereof.

In another aspect, the stand housing and/or integrated camera ring portions of the protective case are formed as separate components from the other portions of the protective case. The stand housing and/or integrated camera ring portions may be formed of any suitable material including metal, polymer, wood, and/or combination or composites thereof and may be formed of materials different that those used to form other components of the protective case.

Additional aspects relate to the construction, configuration and implementation of the various components of the case, the hinged stand and the integrated camera ring therein, the movement and fixed positioning of the stand, alone and in combination with one another.

It should be understood that each of the foregoing and various aspects, together with those set forth in the claims and summarized above and/or otherwise disclosed herein, including the drawings, may be combined to support claims for a device, apparatus, system, method of manufacture, and/or use without limitation.

BRIEF DESCRIPTION OF THE DRAWINGS

These and other features, aspects and advantages are described below with reference to the drawings, which are intended to illustrate, but not to limit, the invention. In the drawings, like reference characters denote corresponding features consistently throughout similar embodiments.

FIGS. 8A-8B are more detailed perspective cross-sectional views of the camera ring housing implementation illustrated in FIG. 7.

FIGS. 9A-9B are partial cross-sectional view of the camera ring housing implementation illustrated in FIG. 7 showing operation of the camera ring stand component and the particular detent configuration that locks the camera ring stand in the open position. FIG. 9A illustrated the camera ring stand in the open position and FIG. 9B illustrated the camera ring stand in the closed position.

Each drawing is generally to scale and hence relative dimensions of the various layers can be determined from the drawings.

DETAILED DESCRIPTION OF THE PREFERRED EMBODIMENT

As summarized and described above, commonly disclosed in FIGS. 1-9B is a protective enclosure or case 100 for a mobile electronic device 200 having an integrated camera ring stand 110 capable of providing a multitude of user viewing/operation positions while protecting and facilitating the operation of the camera feature of the mobile electronic device 200. Individually and collectively, the drawings illustrate, by way of example only, various of the configuration and construction aspects of the case 100. In the particular implementation illustrated, the case 100 is configured for an Apple iPhone 7 mobile or smart phone device. It should be understood, however, that the case may be configured for any mobile device or electronic device, including but not limited to portable or cellular phones, PDAs, MPS or audio/video devices, gaming devices, laptop computers or computing tablet devices that include a camera feature on the exterior of the device.

Figure 1A:
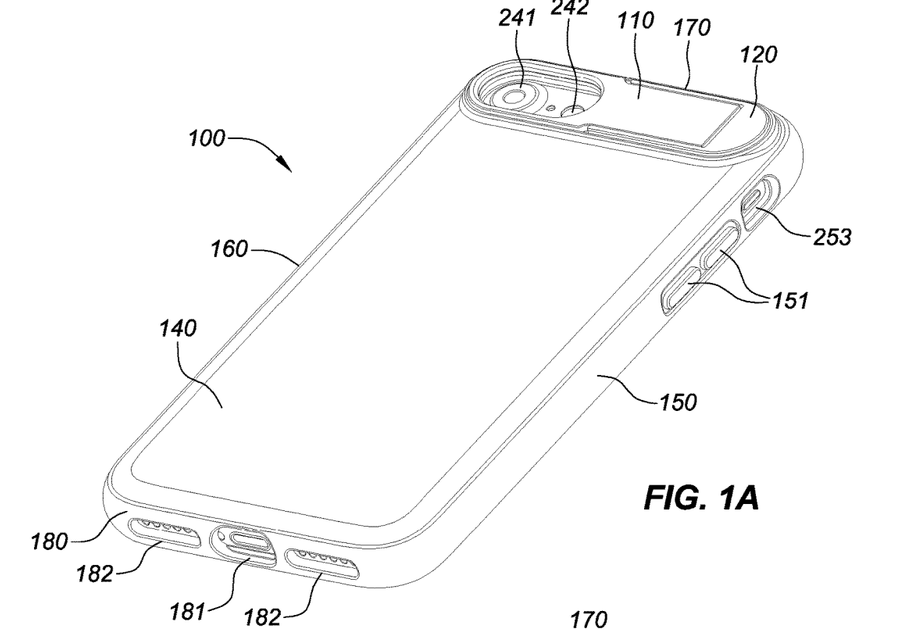
FIGS. 1A-1B are back side and front side perspective views, respectively, of a protective case for a mobile device, with the mobile device being depicted in the case and the camera ring stand in the full closed position, in accordance with the teachings herein. The protective case depicted is specifically configured and dimensioned to receive and retain an Apple iPhone 7® smart phone, which is depicted in FIGS. 1A-1B as being encased therein.
Figure 1B:
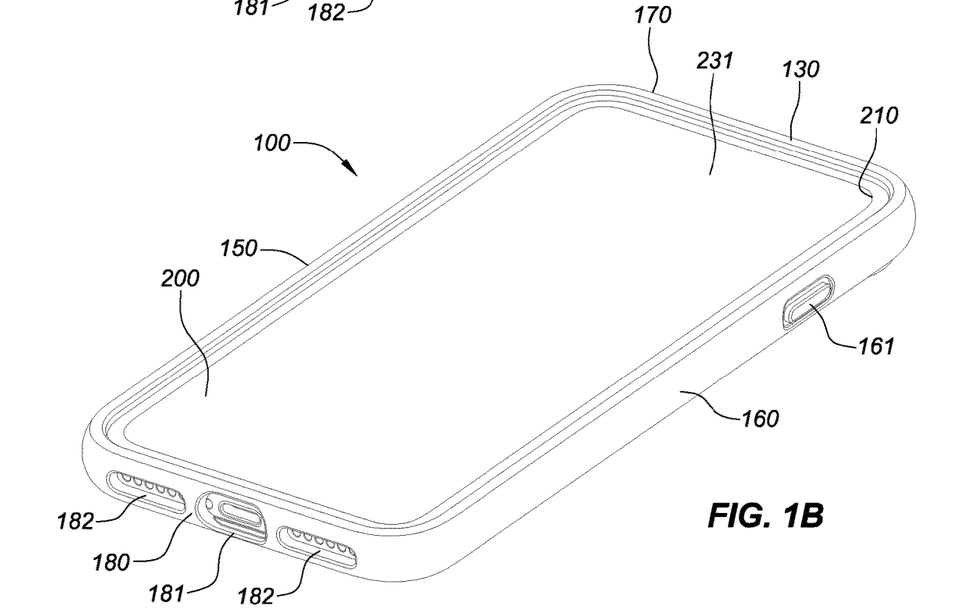
Figure 2A:
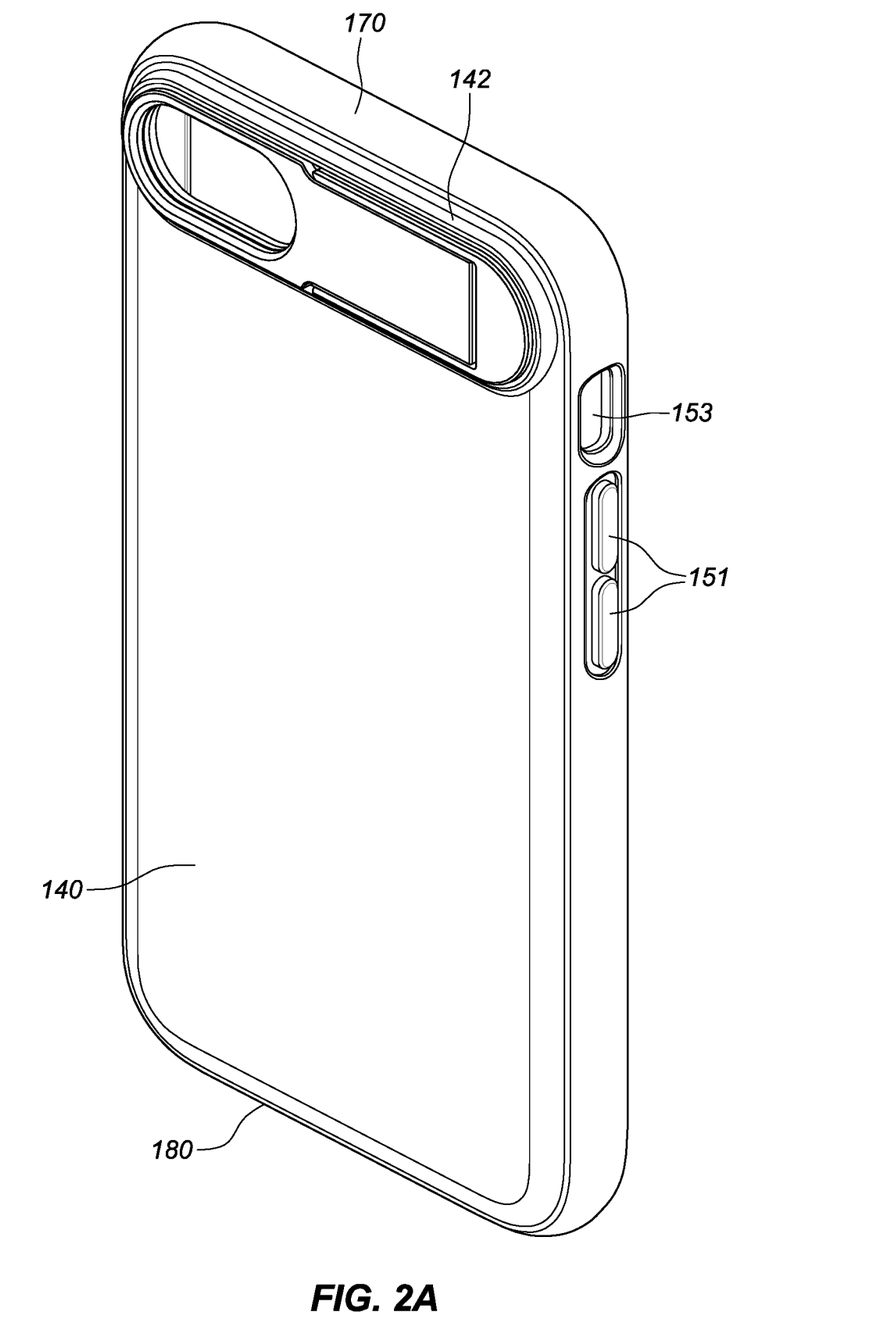
FIGS. 2A-2B are back side and front side perspective views, respectively, of the protective case for a mobile device illustrated in FIGS. 1A-1B, with the mobile device removed from the case.
Figure 2B:
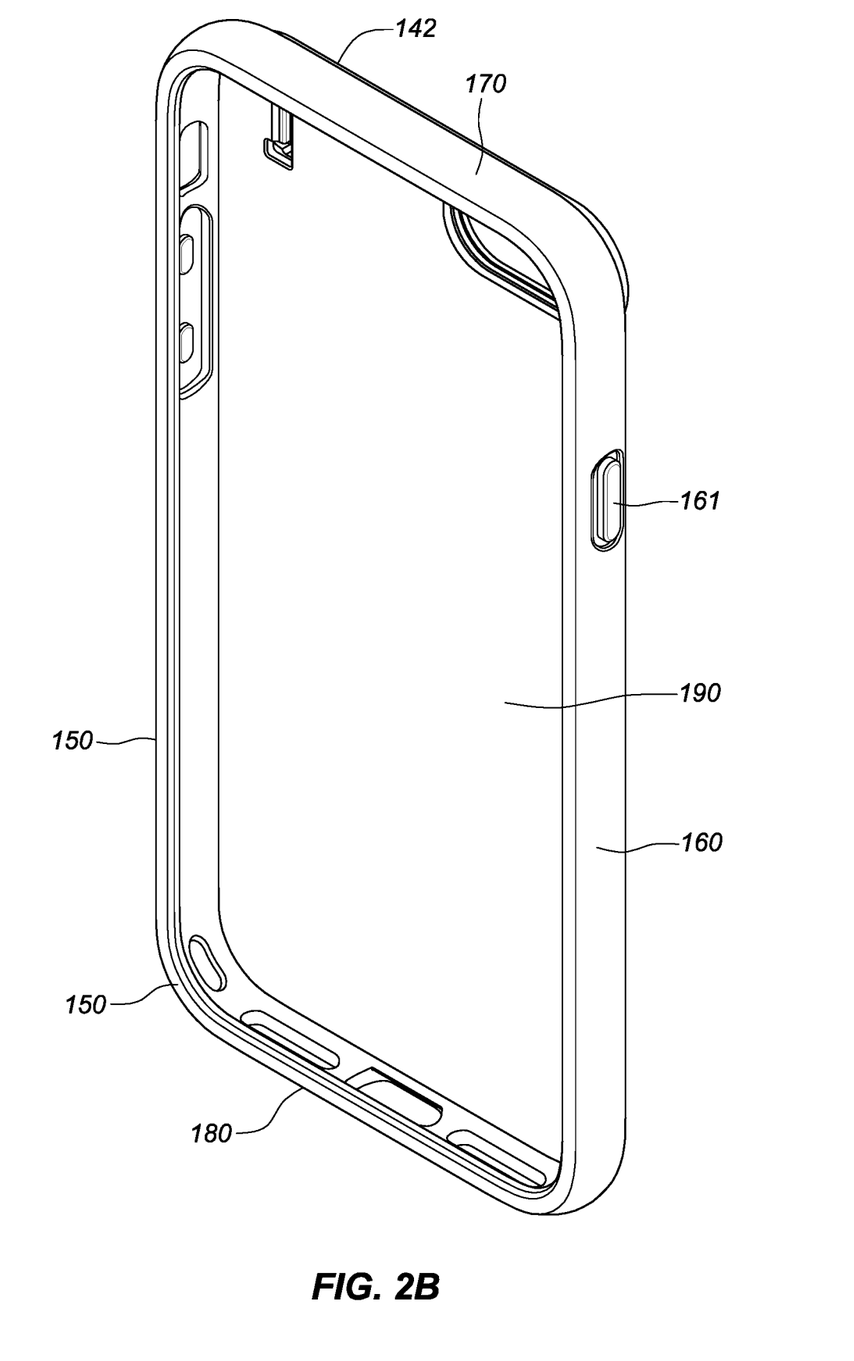
Figure 2C:
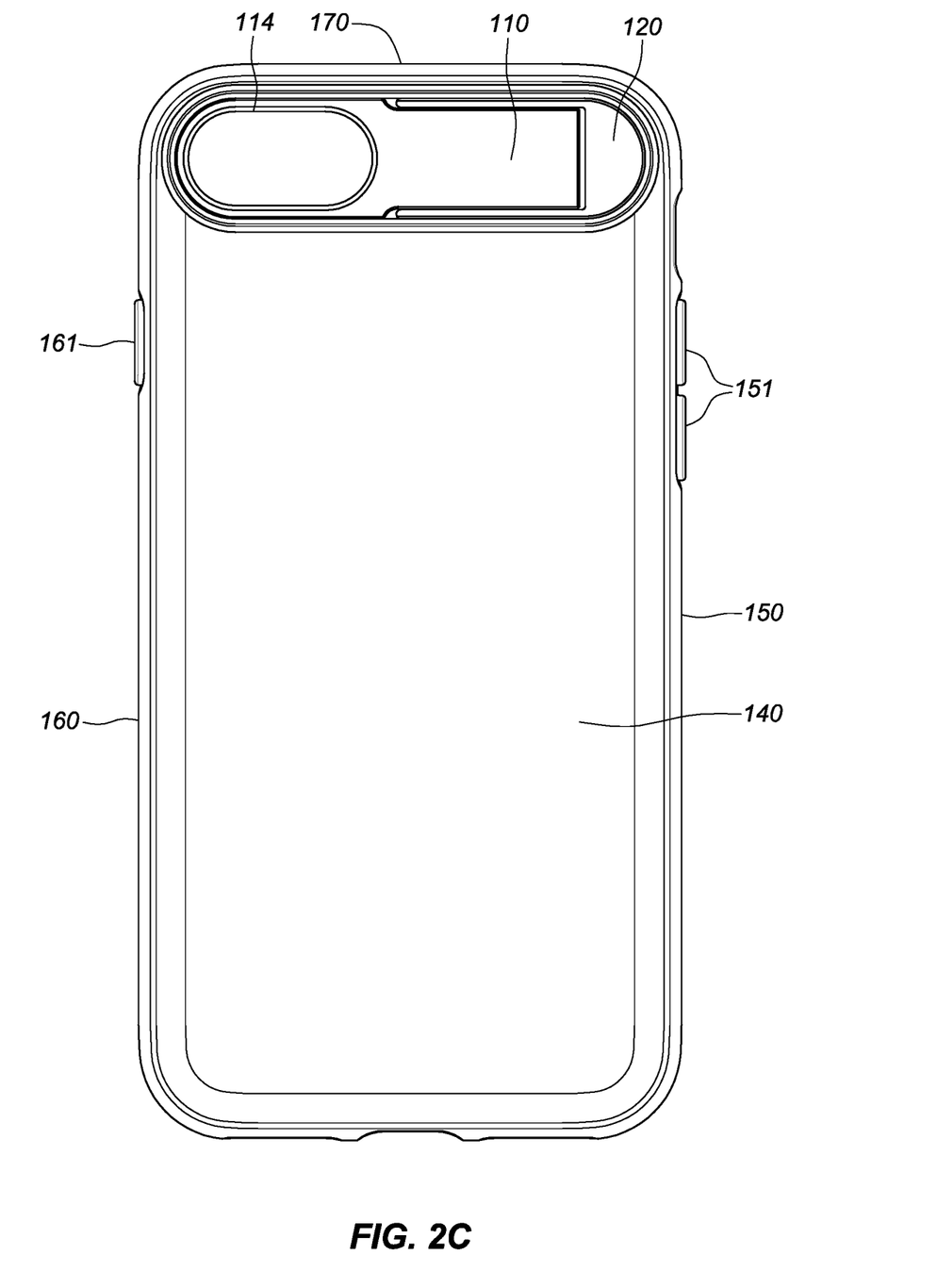
FIGS. 2C-2H are back face, front face, left side, right side, top side and bottom side views, respectively, of the protective case illustrated in FIGS. 1A-1B, with the mobile device removed from the case.
Figure 2D:
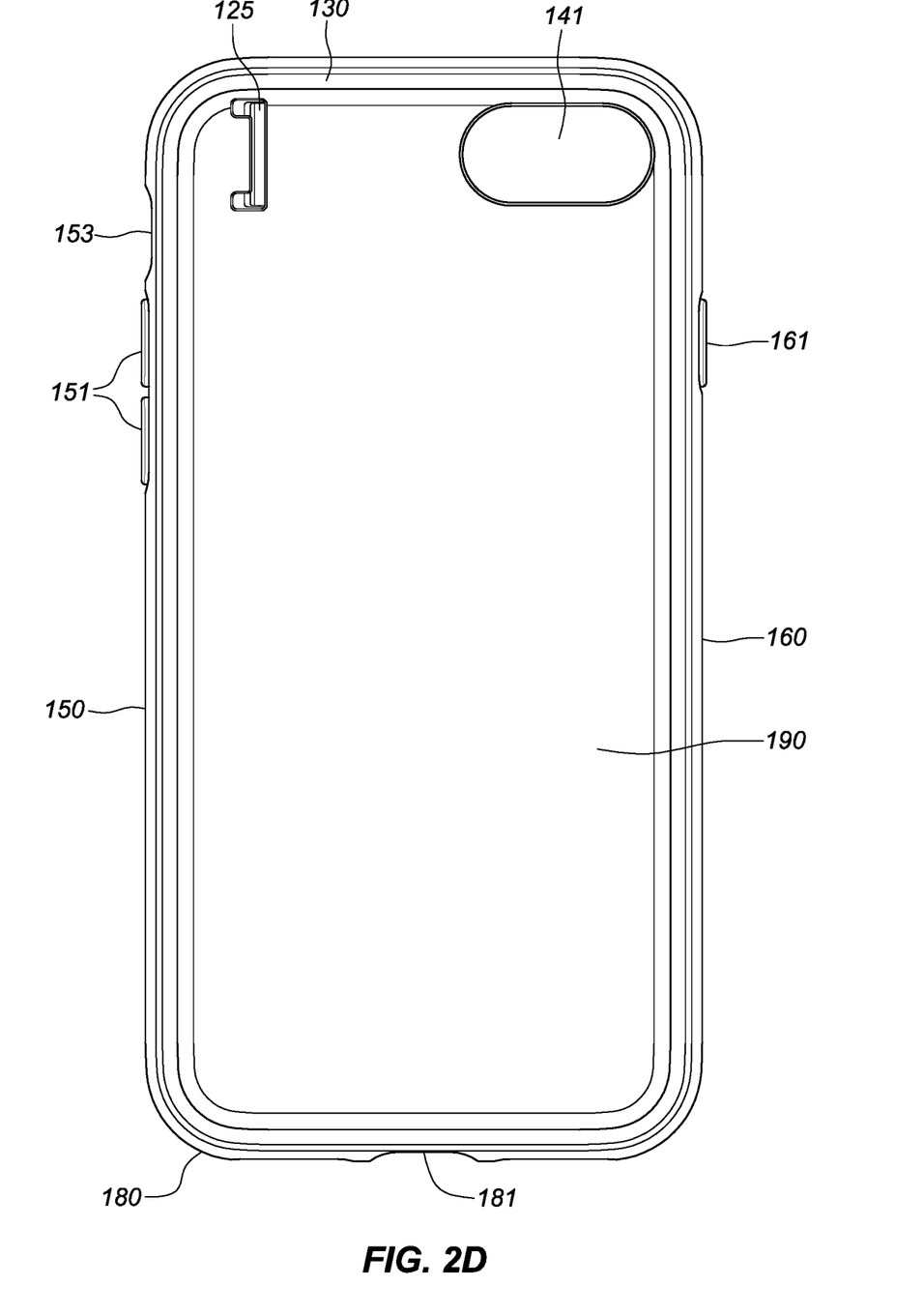
Figure 2E:
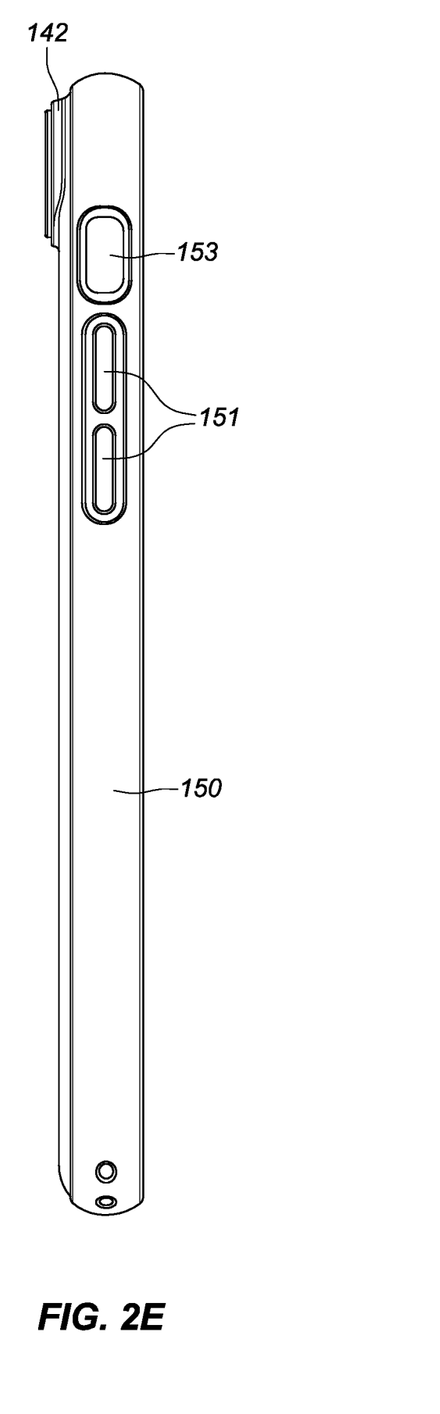
Figure 2F:
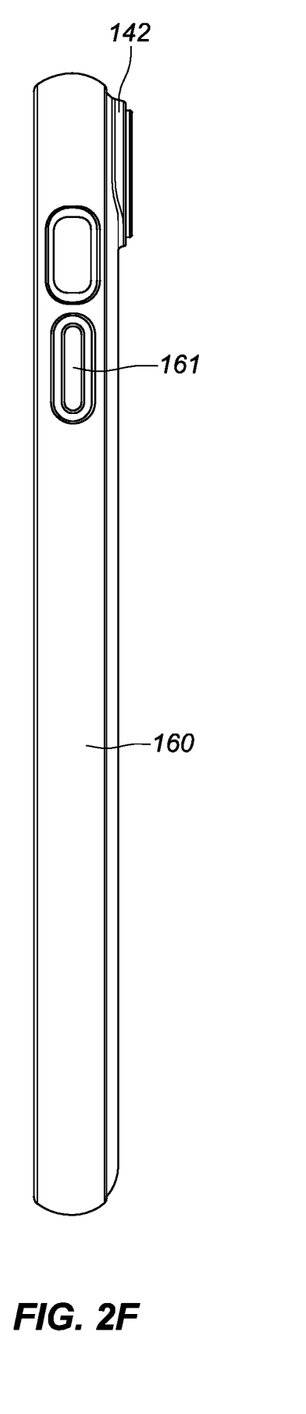
Figure 2G:
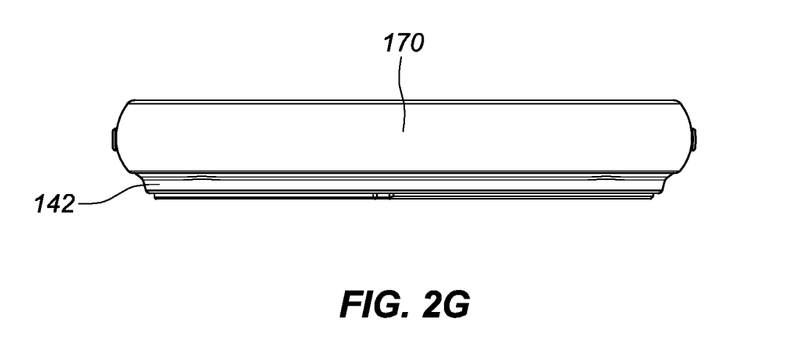
Figure 2H:
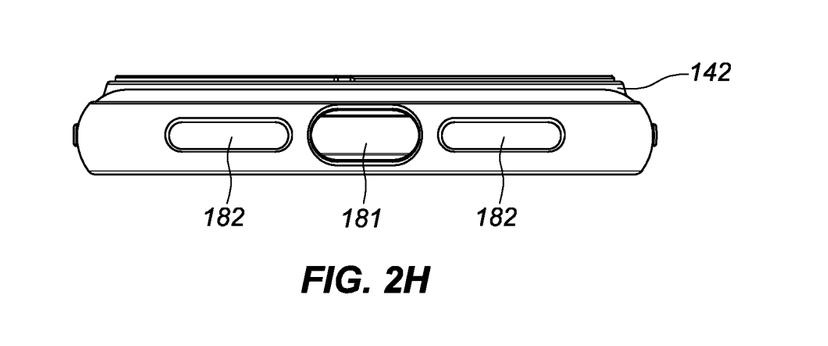
Figure 3A:
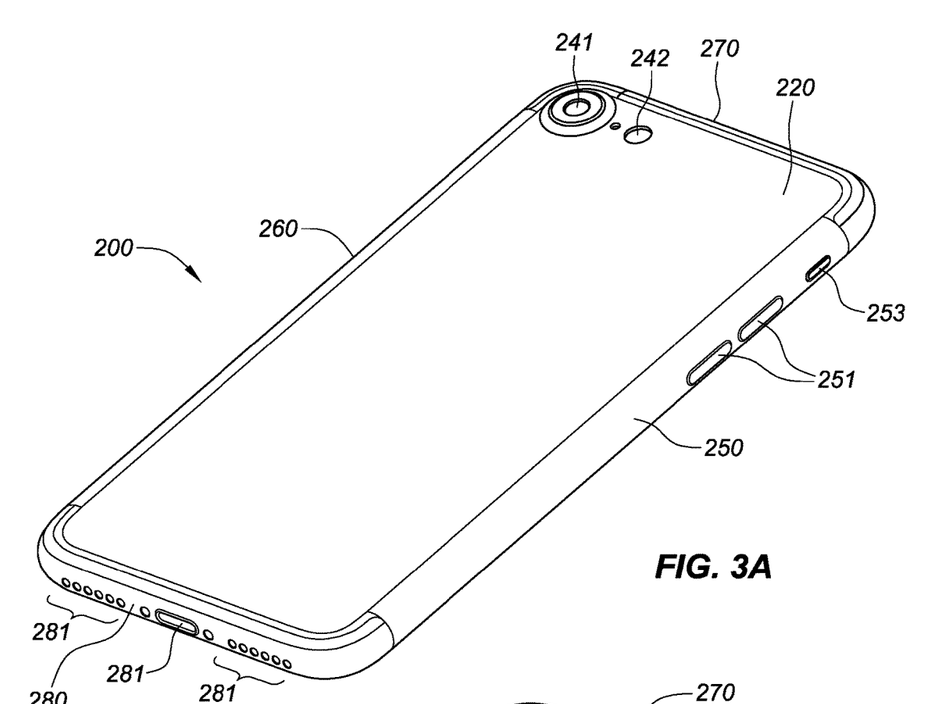
FIGS. 3A-3B are back side and front side perspective depictions, respectively, of the Apple iPhone 7® smart phone, which is depicted as being encased by the protective case illustrated in FIGS. 1A-1B.
Figure 3B:
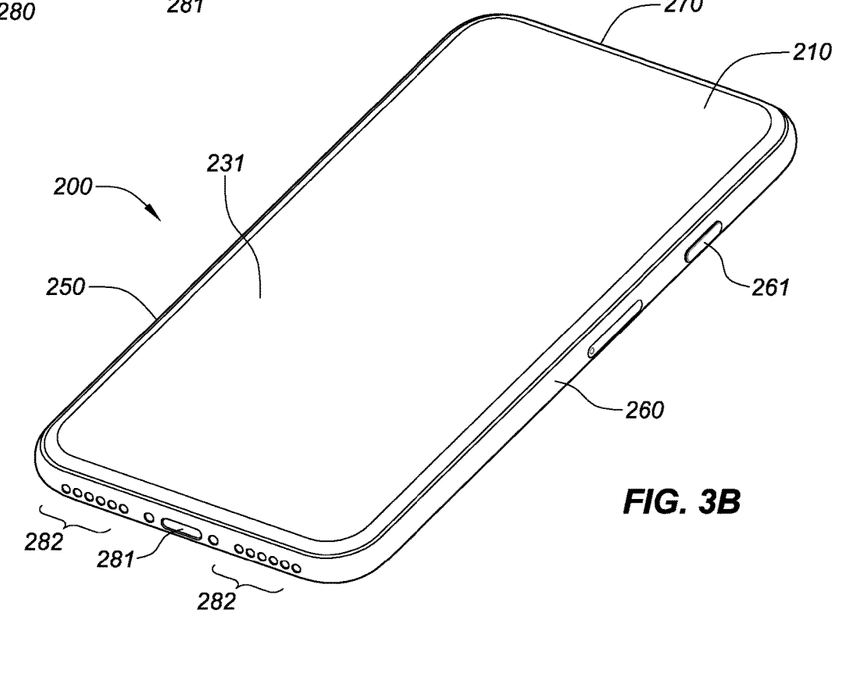
Figure 4A:
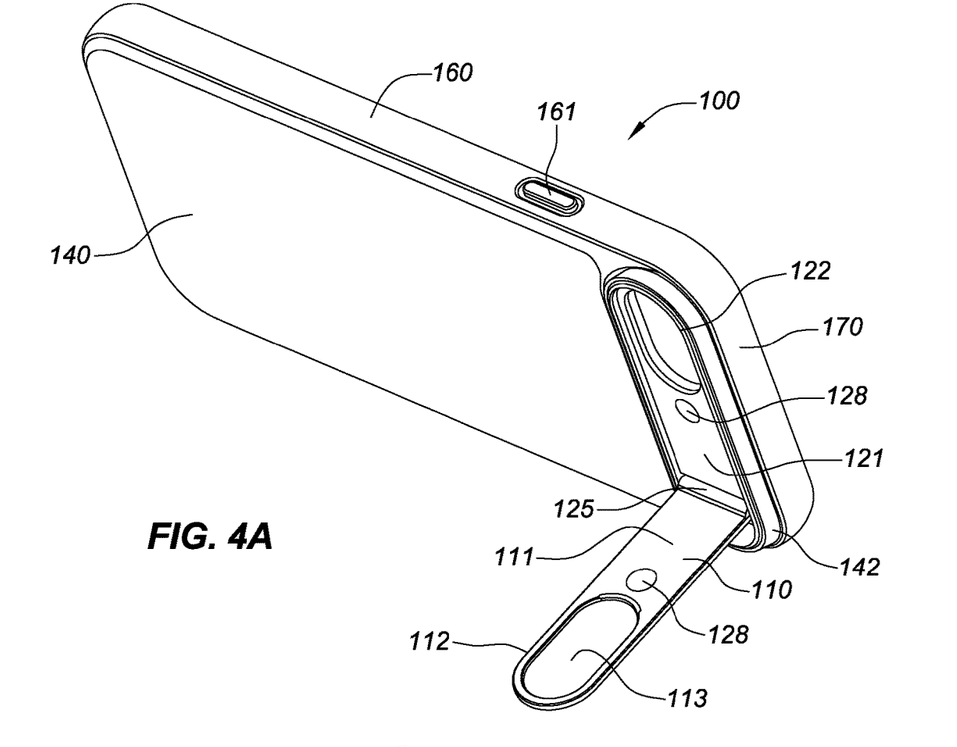
FIG. 4A is a perspective back side view and FIG. 4B is corresponding top side view of the protective case illustrated in FIGS. 1A-1B. Unlike FIGS. 1A-1B, the camera ring stand is illustrated in a fully open position and supports the case on edge in an operative position on its left side.
Figure 4B:
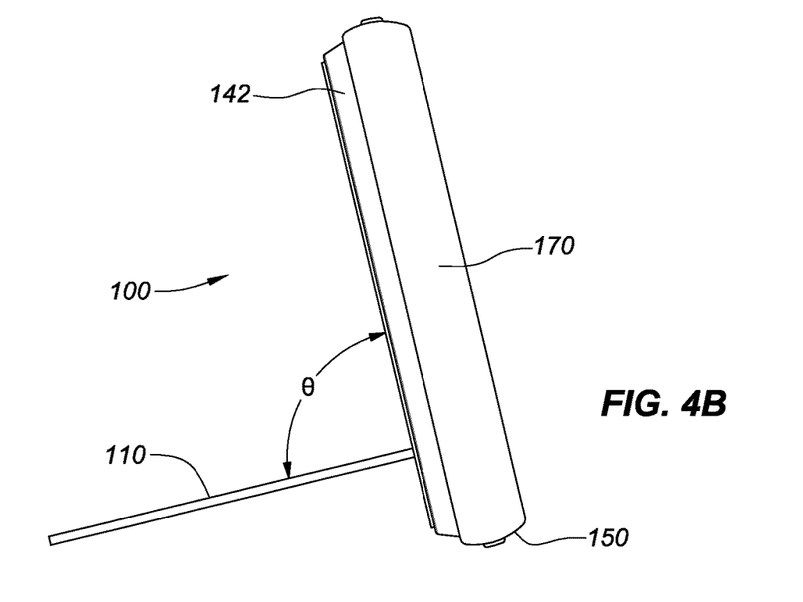
Figure 5A:
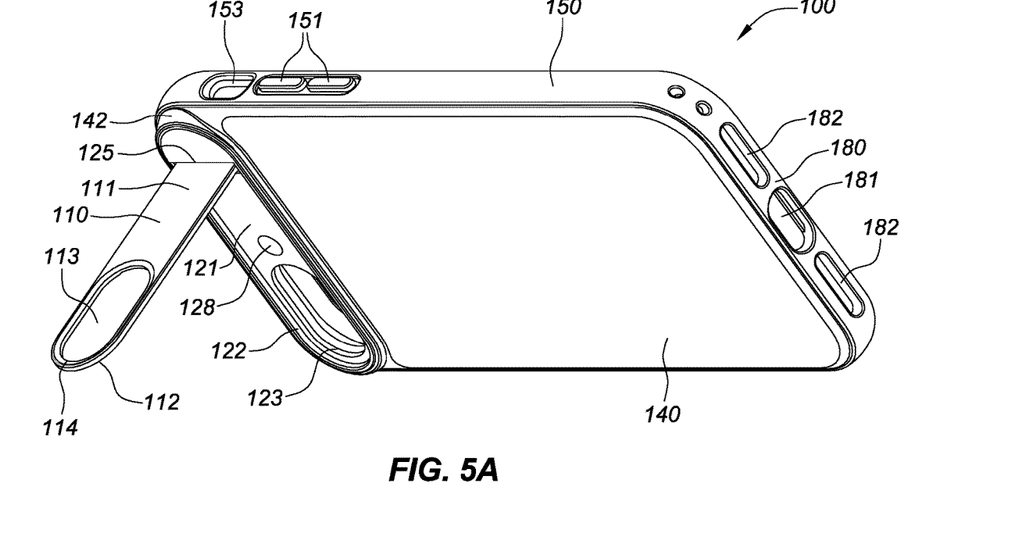
FIG. 5A is a perspective back view and FIG. 5B is corresponding top side view of the protective case illustrated in FIGS. 1A-1B. Unlike FIGS. 1A-1B, the camera ring stand is illustrated in a fully open position and supports the case on edge in an operative position on its right side.
Figure 5B:
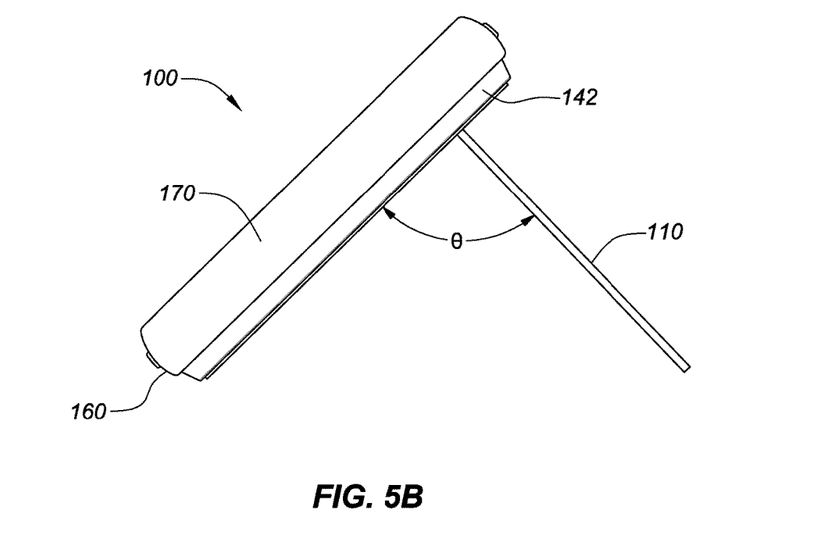
Figure 6:
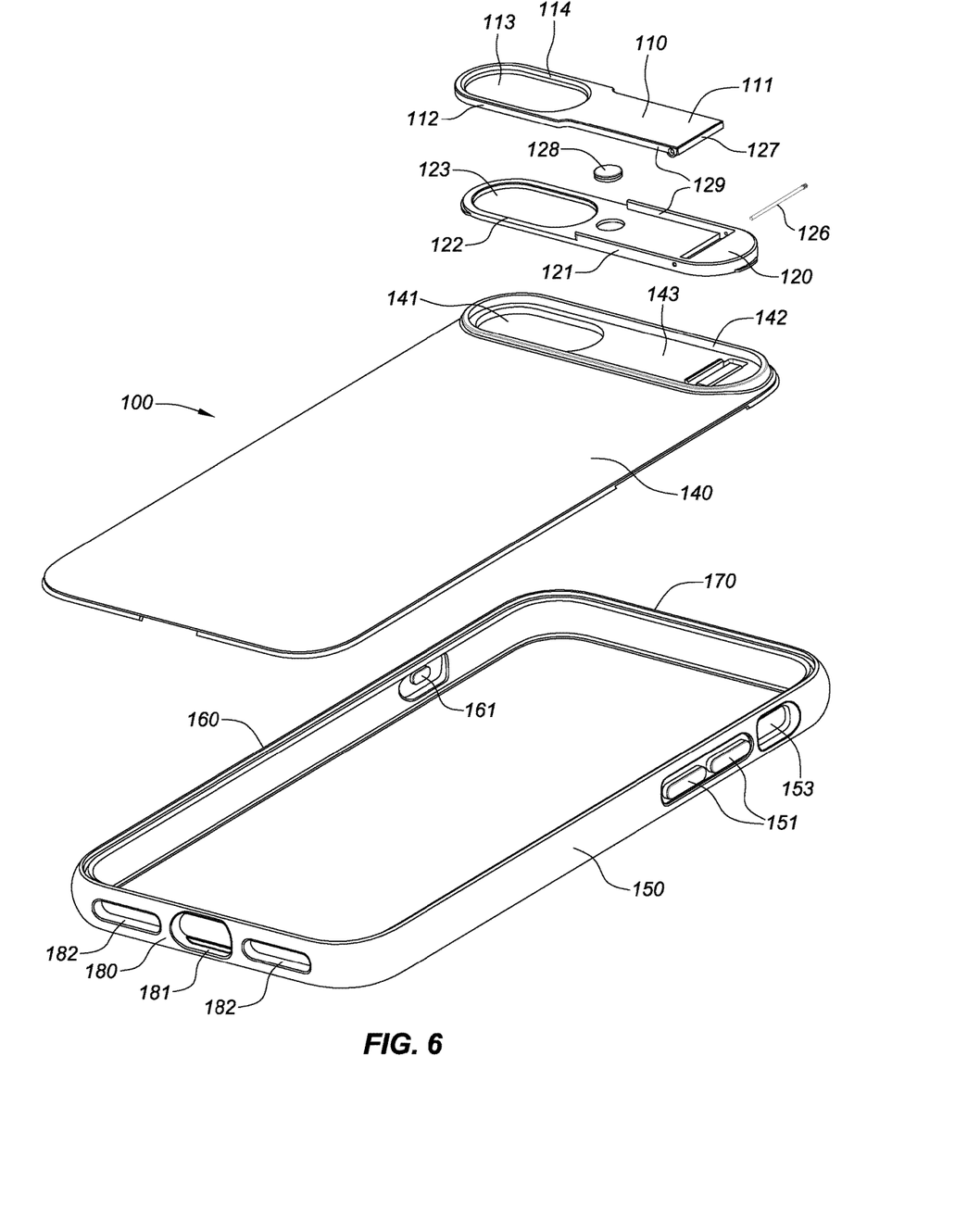
FIG. 6 is a disassembled illustration of the protective case depicted in FIGS. 1A-1F illustrating the components of the case including the camera ring stand assembly.
Figure 7:
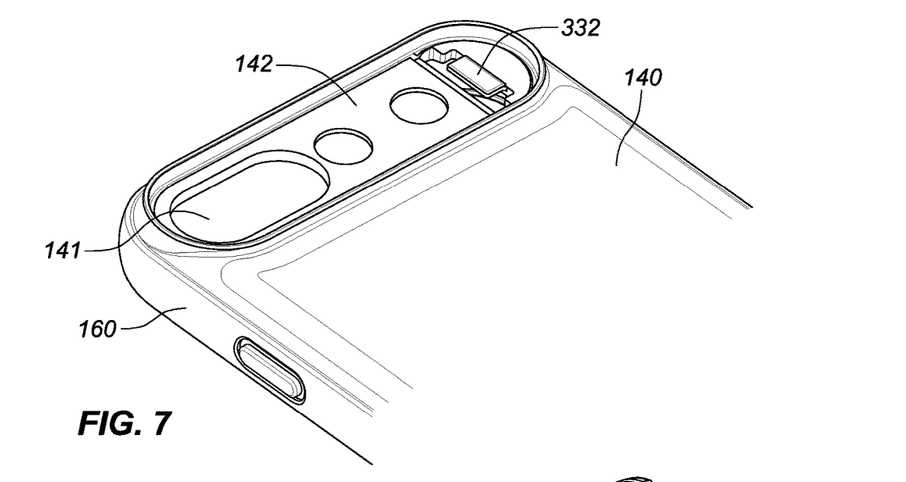
FIG. 7 is a back side perspective view of the protective case depicted in FIGS. 1A-1F, with the camera ring stand and camera ring stand housing removed and illustrating a particular implementation of the camera ring housing.

FIGS. 3A-3B best illustrate the mobile device 200 for which the illustrated embodiment is configured to receive. The Apple iPhone 7 mobile device 200 includes a back side 220, a front side 210, a left side 250, a right side 260, a top side 270 and a bottom side 280. The back side 220 includes a camera lens module 241 and a flash module 242. The front side 210 includes a touchscreen display 231 and also includes a home button, a biometric sensor, and speaker ports (not specifically identified). The left side 250 includes volume up/down buttons 251 and a ring/silent button 253. The right side 260 includes an on/off or sleep/wake button 261. The bottom side 280 includes a Lightening connector port 281 and grilles 282 for built-in microphone and speakers.

As best depicted in FIGS. 1, 2 and 4-6, the protective case 100 includes front and back face walls 130, 140, respectively, and left, right, top and bottom side walls 150, 160, 170, 180, respectively, which collectively define a mobile device compartment 190 that is configured to receive and retain the mobile device 200 therein. Each of the walls 130, 140, 150, 160, 170, 180 are dimensioned to correspond in dimension to the front and back faces, and left, right, top and bottom sides of the mobile device 200, respectively, with the front face wall 130 defining an opening that facilitates interaction and visibility to the touchscreen display 231 of the device 200 and allows for insertion and removal of the mobile electronic device 200 into and out of the case 100.

The back face wall 130 includes a first aperture 141 configured to encompass the Camera lens and flash modules, 241, 242. The back face wall 130 also includes a camera ring housing 142 that is configured to surround the camera lens and flash modules 241, 242 of the mobile device when the device is in the case 100 and that defines a compartment 143 that is configured to receive a hinged camera ring stand assembly, which includes a camera ring stand 110 and camera ring stand housing 120. The camera ring stand 110 includes a first end section 111 and a second end section 112, the second end section includes a second aperture 113, which has a beveled outer perimeter surface 114. The camera ring stand housing 120 also includes a first end section 121 and a second end section 122, with the second end section further including a third aperture 123.

A hinge 125 pivotally couples the first end section 111 of the camera ring stand 110 to the first end section 121 of the camera ring stand housing 120. The hinge 125 comprises a pin 126 and a hollow cylindrical portion 127, sometimes referred to as a knuckle, loop, node or curl, dimensioned to receive the pin 126 and allow the stand to move back and forth from a fully closed position 600 (as illustrated in FIGS. 1A and 2A-2H) to a fully open position 500 (as illustrated in FIGS. 4A-4B and 5A-5B). Magnets 128 and/or detents 129 are provided to fix the camera ring stand 110, in closed and open positions.

In the illustrated implementation, opposing magnets 128 with opposing polarizations facing each other are provided in opposing cavities formed in the mid region of the stand 110 and stand housing 120. When the stand 110 is in the closed position 600, the opposing magnets 128 are positioned to overlie each other and thereby fix the stand 110 in the closed position 600. While the illustrated embodiment shows the use of two magnets 128, it should be understood that a single magnet 128 may be employed (whether on the stand 110 or stand housing 120) with the opposing component surface thereto being an iron, nickel or cobalt metal or composition thereof or other metal that is attracted to magnets.

Detents 129 positioned on one or more sides of the camera ring stand housing 120 and/or camera ring stand 110 may also be employed to fix the position of the stand 110 via an interference fit between the camera ring stand housing 120 and camera ring stand 110. Multiple detents 129 may be employed to retain the stand 110 in the closed position 600 with or without use of magnets 128 and in one or more selected open positions including the fully open position 500.

In application, the detents 129 may be in the form of protrusions that engage within correspondingly dimensions and configured cavities positioned on opposing surfaces of the stand housing 120 and stand 110. The protrusions may be formed on one or more sides of the camera ring stand 110 while the cavities may be formed in adjacent regions of the stand housing 120, or vice versa. To facilitate fixing the stand in an open position, detents may be provided near the base or the hinge 125 of the stand 110. To facilitate fixing the stand in the closed position 600, detents 129 may be positioned at more distal regions of the stand 110 and stand housing 120.

It should be understood that the angle $\theta$ of the camera ring stand 110 relative to the back face wall 140 of the case 100 (best illustrated in FIGS. 4B and 5B) can be defined by the location of the detents 129. Thus, while camera ring stand 110 in the fully open position 500 is depicted to effectuate a certain angle $\theta$, it should be understood that the angle $\theta$ of the camera ring stand 110 relative to the back face wall 140 of the case 100 may be modified (i.e., greater or less than angle $\theta$ depicted) to implement the desired operating position. For example, by positioning the detents 129 on the camera ring stand 110 and stand housing 120 closer to the camera lens 241, a more acute angle θ may be effectuated. Alternatively, by position the detents 129, on the camera ring stand 110 and stand housing 120, farther away from the camera lens 241, a more obtuse angle θ may be effectuated.

FIGS. 7-9B, illustrate a particular implementation of a detent locking configuration that allows fixing the stand 110 into a locked open position 500. In this implementation, the camera ring stand 110 includes a first protrusion 331 at its first end section 121 that extends on the opposite side of the hinge 125 and in an opposing direction (relative to the hinge) from the second end section 122 of the stand 110 that contains the second aperture 113. The camera ring housing 142 includes a second protrusion 332 that extends from the perimeter region of the camera ring housing 142 towards a cavity 333 that is located adjacent the hinge region.

Figure 9A:
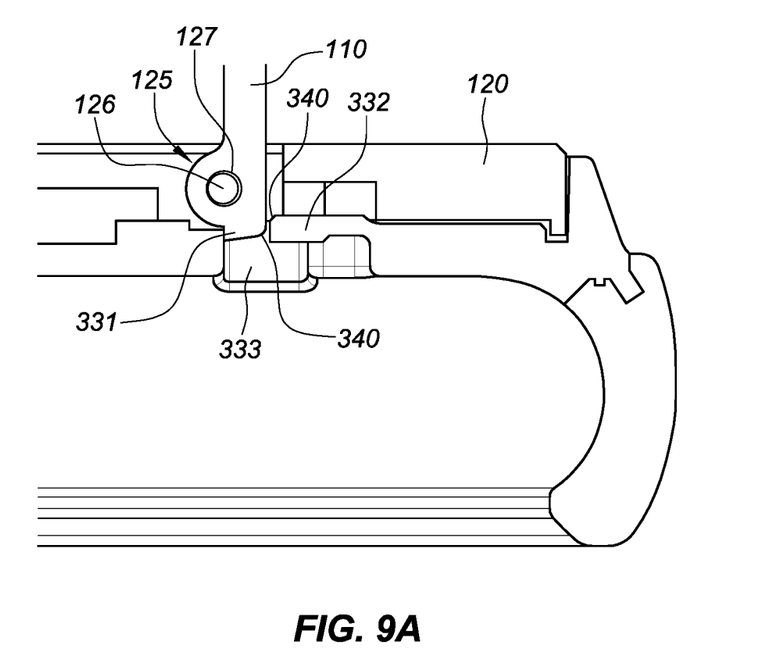
Figure 9B:
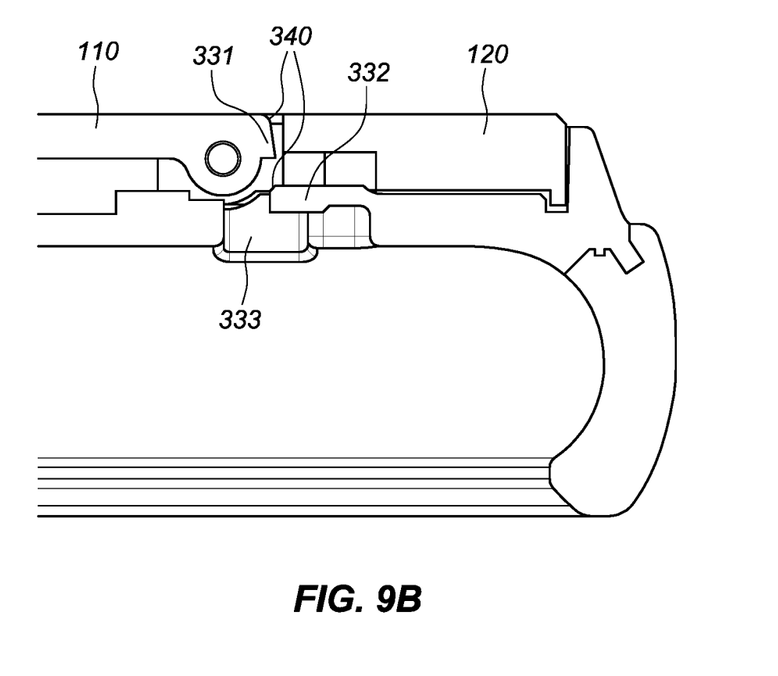

When the camera ring stand 110 is moved from the closed position (as best illustrated in FIG. 9B), the first protrusion 331 push downward over the second protrusion 332, which is configured to flex with the force imparted by the first protrusion 331 and allow passage of the first protrusion into the cavity 333. The second protrusion 332 is dimension to retain the first protrusion 331 within the cavity 333 when the camera ring stand 110 is in the open position 500 and hence lock the stand 110 in the open position 500.

Figures 8A, 8B:
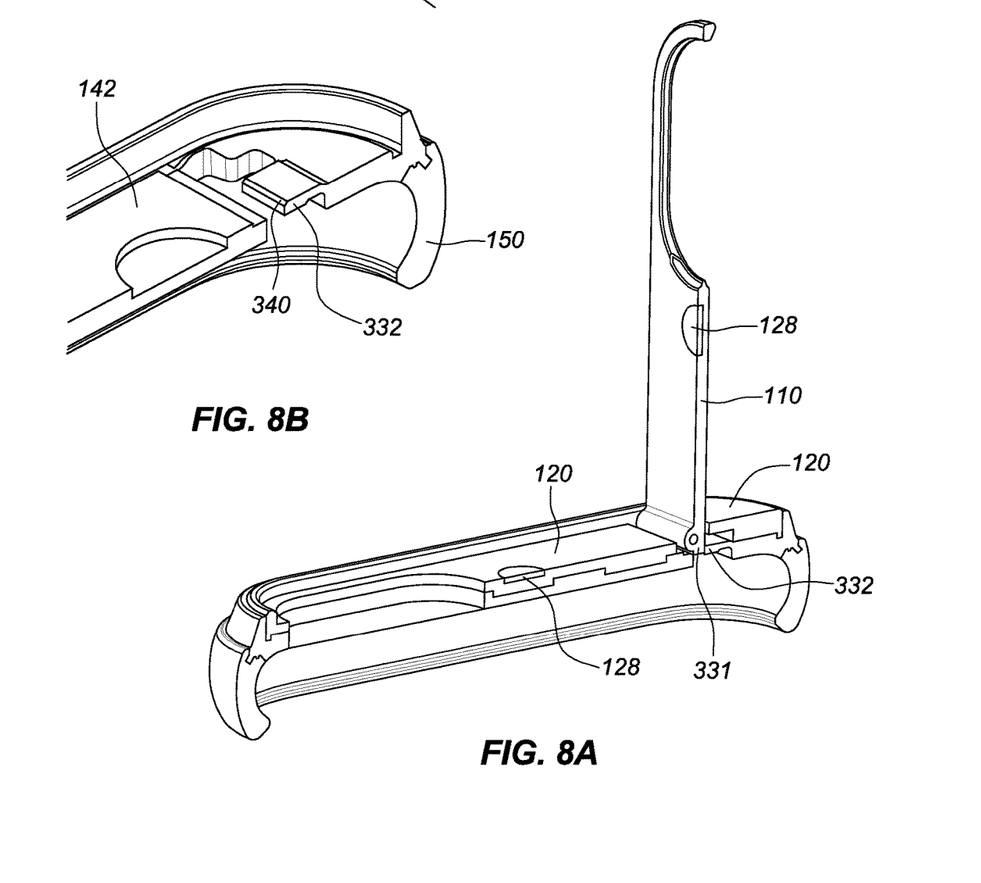
FIG. 8A illustrates the camera ring housing with the camera ring stand housing and camera ring stand being in the open position.
FIG. 8B illustrates a partial cross-sectional view of the camera ring housing with the camera ring stand housing and camera ring stand removed.

To close the camera ring stand 110, the user exerts force on the second end section 122 of the camera ring stand 110, the force then pushes the protrusion 331 out of the cavity 333 and back over the second protrusion 332, which is configured to flex outward with the force, and thereby allow the first protrusion 331 to pass by the second protrusion 332 and unlock the camera ring stand 110 from the fixed and locked open position 500. The protrusions 331 and 332 are thus configured to frictionally interact with one another yet allow for relative movement between them when moving the camera ring stand 110 in and out of the open locked position. To facilitate the frictional movement between the first and second protrusion 331 and 332, the corners of the protrusions 331 and 332 include rounded or beveled regions 340, which are best depicted in FIGS. 8B, 9A and 9B.

While in the illustrated implementation, depicts the camera ring housing 142 and camera ring stand housing 120 as separate components, it should be understood that they may be formed as a unitary element, such that the first and third apertures 141, 123 constitute the same opening. Also while, the first, second, and third apertures 141, 113, and 123 are illustrated as being coextensive and oval in shape, it should be understood that the apertures need not be coextensive in dimension and may have alternative shapes including polygonal, circular, triangular, square, rounded rectangular, hexagonal, octagonal or other shapes. Thus for example, the first aperture may be larger than the second and third apertures and the second aperture may be larger than the third aperture. Similarly, by way of example, the first aperture may have a first shape, the second aperture may have a second shape and the third aperture may have a third shape, each of the first, second and third shapes may be different.

The case 100 may be constructed of a composition comprising one or more materials including but not limited to polycarbonate; thermoplastic urethane (TPU), thermoplastic elastomer (TPE), acrylonitrile butadiene styrene (ABS), nylon, metal, silicone rubber, or any combination thereof. For example, the back face wall 140 may be formed of a composition comprised of polycarbonate (PC), a combination of polycarbonate and ABS, nylon, fiber reinforced plastic, and/or metal. The left, right, top and bottom walls 150, 160, 170, 180 may be formed of a softer materials or more elastic material such as composition comprised of TPU and/or TPE or other suitable material to allow sufficient flexibility in the front face wall 130 so that the mobile device 200 can be inserted through the opening therein and retained with the mobile device compartment 190 by the perimeter regions of the front face wall 130.

The camera ring stand 110, camera ring stand housing 120 and hinge 125 may be formed of the same or different materials from those used in other components or regions of the protective case 100. In one implementation, the camera ring stand 110, camera ring stand housing and hinge 125 are constructed of metal, such as aluminum or stainless steel, whereas the remaining portions of the case 100 including the camera ring housing 142 are constructed of polymers such as described above. In another exemplary implementation, the camera ring stand 110 and the camera ring stand housing 120 are co-molded of a polymer with the back face wall 140 of the case 100.

Also, while a specific implementation of a hinge 125 is illustrated, it should be understood that any suitable hinge 125 may be employed including but not limited to spring, barrel, pivot, butt/mortise, continuous/piano, concealed, butterfly, flag, strap, H, HL, T, Gate, flush, or Soss type hinges. In this regard, it should also be understood that a living hinge may be employed such as the type disclosed in US Patent Publication No. 2016/0249472, which is hereby incorporated by reference. For example, the living hinge may be formed of a thin section of plastic or polymer that pivotally connects the camera ring stand 110 to the camera ring stand housing 120. The thin plastic or polymer is configured to enable the stand 110 to rotate relative to the housing 120. In such a construction, the stand 110 and stand housing 120 may be co-molded with the hinge 125, which may also be co-molded as a part of other portions of the case 100, such as the back face wall 140. Alternatively, the hinge 125 may be formed of a flexible natural or synthetic fabric that is configured to enable the stand 110 to rotate relatively to the housing 120. One of ordinary skill in the art would understand that there are numerous suitable alternative hinge configurations and constructions that may be employed that fall within the scope of this disclosure.

In operation, the user inserts the mobile electronic device 200 into the compartment 190 of case 100 through the more pliable or less rigid front face wall 130 of the case 100 so that the touchscreen display 231 is visible through the opening in front face wall 130. The perimeter regions of the front face wall 130 overlap the front side 210 of the mobile device 200 and retain the mobile device 200 within the device compartment 190. Once inserted into the case 100, the user may selectively open and close the camera ring stand 110. The magnets 128 and/or detents 129 selectively fix the position of the camera ring stand 110 in the desired closed or open position. In the open position 500, the case 100 may be operably positioned on edge either on the right side or the left side (as depicted in FIGS. 5A-5B and 4A-4B, respectively), with the camera ring stand 110 serving to support the case 100 on edge.

Each of the foregoing and various aspects, or teachings herein together with those set forth in the claims and described in connection with the protective case described and summarized above or otherwise disclosed herein including the drawings may be combined to form claims for a device, apparatus, system, method of manufacture, and/or use without limitation.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the various aspects have been shown and described in detail, other modifications, which are within their scope will be readily apparent to those of skill in the art based upon this disclosure. It should therefore be also understood that the scope of this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of claims made in this patent document and any future patent document that relies on this disclosure.

Similarly, this method of disclosure, is not to be interpreted as reflecting an intention that any claim require more features than are expressly recited in that claim. Rather, as the following claims represent, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A protective case for a mobile electronic device having a touchscreen on its front face and a camera lens on an opposing back face, said protective case comprising:
   a mobile device compartment configured to retain and be reversibly attachable to said mobile electronic device;
   said mobile device compartment being defined by multiple walls including a back face wall that is configured to overlie the back face of the mobile device when the device is in the case;
   said back face wall including a first aperture that is configured to encompass the camera lens on the back face of the mobile device when the device is in the case; and
   a stand that is coupled by a hinge to said back face wall and adapted to be movable from a closed position to an open position, said stand further comprising a first end section and a second end section, wherein said first end section is closer to the hinge than said second end section, and wherein said second end section further including a second aperture that is dimensioned to at least partially encompass the camera lens when the stand is in the closed position.

2. The protective case of claim 1, wherein the first end section of the stand is coupled by the hinge to the back face wall.

3. The protective case of claim 1, wherein the first and second apertures are each configured to encompass both the camera lens as well as a flash module on the back face of the mobile electronic device.

4. The protective case of claim 1, wherein the second aperture is coextensive with said first aperture.

5. The protective case of claim 1, wherein the second aperture is defined by a perimeter beveled surface.

6. The protective case of claim 1, wherein the first and second apertures are oval in shape.

7. The protective case of claim 1, wherein the first and second apertures are polygonal in shape.

8. The protective case of claim 1, wherein the first aperture includes a first width and a first length, wherein the first width is greater than the first length, wherein the second aperture includes a second width and a second length, and wherein the second width is greater than the second length.

9. The protective case of claim 1, wherein the first aperture is defined by a first perimeter surface and the second aperture is defined by a second perimeter surface, and wherein said first and second perimeter surfaces are black in color.

10. The protective case of claim 1, wherein in the closed position, the stand is fixed in position relative to the back face wall.

11. The protective case of claim 1, wherein in the closed position, the stand is magnetically fixed in position relative to the back face wall.

12. The protective case of claim 1, wherein a first magnetic element is coupled to the back of the protective case and wherein the stand includes a second magnetic element adapted to be attracted to the first magnetic element, wherein said first and second magnetic elements are positioned adjacent to one another when the stand is in the closed position, and wherein the attraction between the first and second magnetic elements retains the stand in the closed position.

13. The protective case of claim 1, wherein when the stand is in the open position, the stand is fixed in position relative to the back face wall.

14. The protective case of claim 1, wherein when the stand is in the open position, the stand is mechanically fixed in position relative to the back face wall by a detent that resists rotation of the stand.

15. A protective case for a mobile electronic device having a touchscreen on its front face and a camera lens on an opposing back face, said protective case comprising:
   a mobile device compartment configured to retain and be reversibly attachable to said mobile electronic device;
   said mobile device compartment being defined by multiple walls including a back face wall that is configured to overlie the back face of the mobile device when the device is in the case;
   said back face wall including a first aperture that is configured to encompass the camera lens on the back face of the mobile device when the device is in the case; and
   a stand that is coupled by a hinge to said back face wall and adapted to be movable from a closed position to an open position, said stand further comprising a first end section and a second end section, said second end section further including a second aperture that is dimensioned to at least partially encompass the camera lens when the stand is in the closed position, wherein said back face wall includes a camera ring housing that is configured to surround the camera lens of the mobile device when the device is in the case, said camera ring housing further defining a second compartment that is dimensioned to receive a camera ring stand housing and the stand when the stand is in the closed position.

16. The protective case of claim 15, wherein said stand is hinged to said back face by the stand housing that is coupled within said camera ring housing, said stand housing further defining a third compartment that is dimensioned to receive the stand when the stand is in the closed position and a third aperture that is configured to encompass the camera lens on the back face of the mobile device when the device is in the case.

17. The protective case of claim 16, wherein said first, second and third apertures are each defined by perimeter surfaces that are black in color.

18. The protective case of claim 16, wherein said camera ring housing is molded into the back face wall.

19. The protective case of claim 16, wherein said stand and stand housing is formed of metal.

20. A protective case for a mobile electronic device having a touchscreen on its front face and a camera lens and flash module on an opposing back face, said protective case comprising:
- a mobile device compartment configured to retain and be reversibly attachable to said mobile electronic device, said mobile device compartment being defined by multiple walls including a back face wall that is configured to overlie the back face of the mobile device when the device is in the case, said back face wall including a first aperture that is configured to encompass the camera lens and flash module on the back face of the mobile device when the device is in the case; and
- a stand comprising a first end section and a second end section that the first end section is coupled by a hinge to said back face wall, said second end section including a second aperture which has a beveled outer perimeter surface, said stand being configured to surround said first aperture and being movable from a fixed closed position to a fixed open position.

* * * * *